(12) United States Patent
Kinoshita et al.

(10) Patent No.: US 6,405,612 B1
(45) Date of Patent: Jun. 18, 2002

(54) ELECTRIC STEERING COLUMN

(75) Inventors: Satoshi Kinoshita, Aichi; Toshihiko Warashina, Shizuoka, both of (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 09/604,831

(22) Filed: Jun. 28, 2000

(30) Foreign Application Priority Data

Jun. 29, 1999 (JP) .......................................... 11-183033
Sep. 1, 1999 (JP) .......................................... 11-246895

(51) Int. Cl.[7] .............................. B62D 5/04; B62D 3/04; B62D 1/18
(52) U.S. Cl. ..................... 74/411; 74/388 PS; 74/425; 74/493; 74/500; 464/30; 464/89; 464/158
(58) Field of Search ................................ 74/89.14, 411, 74/425, 493, 500, 388 PS; 180/443, 444; 464/30, 32, 45, 89, 158

(56) References Cited

U.S. PATENT DOCUMENTS

| | | | | |
|---|---|---|---|---|
| 3,428,155 A | * | 2/1969 | Binder et al. | 464/68 X |
| 3,812,551 A | * | 5/1974 | Mortensen | 464/42 X |
| 4,626,112 A | * | 12/1986 | Kramer | 464/30 X |
| 4,772,245 A | * | 9/1988 | Readman et al. | 464/89 |
| 5,482,128 A | * | 1/1996 | Takaoka et al. | 180/444 |
| 5,739,616 A | | 4/1998 | Chikaraishi et al. | 310/194 |

FOREIGN PATENT DOCUMENTS

| | | | |
|---|---|---|---|
| JP | 50-118625 | | 9/1975 |
| JP | 5-22463 | | 6/1993 |
| JP | 6-1503 | | 1/1994 |
| JP | 9-101212 | | 4/1997 |
| JP | 11-59441 | * | 3/1999 |

* cited by examiner

Primary Examiner—Allan D. Herrmann
(74) Attorney, Agent, or Firm—Foley & Lardner

(57) ABSTRACT

An electric steering column for a motor vehicle is provided, which has a steering shaft. A jacket tube extends along the steering shaft to cover the same. A worm wheel is rotatably held by the jacket tube and has a center bore through which a given portion of the steering shaft loosely passes. A collar member is tightly disposed on the given portion of the steering shaft defining an annular clearance between the collar member and the worm wheel. An elastically deformable structure is put and compressed in the annular clearance in such a manner as to induce a rotation of the collar member when the worm wheel is rotated. An electric motor rotates the worm wheel with an electric power. Due to provision of the elastically deformable structure, a possible ill-alignment between the worm wheel and the collar member is absorbed or compensated.

15 Claims, 7 Drawing Sheets

ELECTRIC STEERING COLUMN

BACKGROUND OF THE INVENTION

1. Field of the Invention

The present invention relates in general to steering columns of wheeled motor vehicles, and more particularly to steering columns of a type wherein, like those used in an automatic driving system, a steering shaft thereof is powered by an electric motor. More specifically, the present invention is concerned with an arrangement through which a torque transmission from an electric motor to the steering shaft is assuredly made even if a relative displacement occurs therebetween.

2. Description of the Prior Art

Electric steering columns are used in the field of automatic driving system wherein operation of the steering shaft is carried out by an electronically controlled electric motor without manipulation by a driver. One of such steering columns comprises a worm wheel which is concentrically mounted on the steering shaft and a worm which is fixed to an output shaft of the electric motor and meshed with the worm wheel. The electric motor is held by a jacket tube which covers and extends along the steering shaft. Thus, upon energization of the electric motor, a torque of the electric motor is transmitted to the steering shaft through the worm and the worm wheel. The torque of the steering shaft is then transmitted to a steering gear box for controlling steered road wheels. Usually, the worm wheel is fixedly disposed on the steering shaft by means of spline connection or the like.

However, in the above-mentioned steering column, quite precise manufacturing work is needed for assembling the steering shaft and the jacket tube. That is, if such precise work is not provided, an ill-alignment tends to occur between the two members, which causes a poorly or incompletely meshed engagement between the worm and the worm wheel. Of course, in this case, the torque of the electric motor is not smoothly transmitted to the steering shaft due to increased friction caused by the poorly meshed engagement. Furthermore, the direct engagement between the worm and the worm wheel tends to produce noises.

SUMMARY OF THE INVENTION

It is therefore an object of the present invention to provide an electric steering column which is free of the above-mentioned drawbacks.

Another object of the present invention is to provide an electric steering column which can be easily assembled.

According to a first aspect of the present invention, there is provided an electric steering column which comprises a steering shaft; a jacket tube extending along the steering shaft to cover the same; a worm wheel rotatably held by the jacket tube, the worm wheel having a center bore through which a given portion of the steering shaft loosely passes; a collar member tightly disposed on the given portion of the steering shaft defining an annular clearance between the collar member and the worm wheel; an elastically deformable structure put and compressed in the annular clearance in such a manner as to induce a rotation of the collar member when the worm wheel is rotated; and an electric motor that rotates said worm wheel with an electric power.

According to a second aspect of the present invention, there is provided an electric steering column which comprises a steering shaft; a jacket tube extending along the steering shaft to cover the same; a housing fixed to the jacket tube; a worm wheel rotatably held in the housing, the worm wheel having a center bore through which a given portion of the steering shaft loosely passes; an internal gear structure integrally formed on a cylindrical wall of the center bore of the worm wheel; a collar member loosely received in the center bore of the worm wheel and tightly disposed on the given portion of the steering shaft; an external gear structure integrally formed on a cylindrical outer wall of the collar member, the external gear structure and the internal gear structure being meshed while leaving a certain space therebetween; O-rings made of elastic material, each O-ring being compressed between the internal and external gear structures to induce rotation of the collar member when the worm wheel is rotated; and an electric motor held by the housing, the motor rotates the worm wheel with an electric power.

According to a third aspect of the present invention, there is provided an electric steering column which comprises a steering shaft; a jacket tube extending along the steering shaft to cover the same; a housing fixed to the jacket tube; a worm wheel rotatably held in the housing, the worm wheel having a center bore through which a given portion of the steering shaft loosely passes; a collar member tightly disposed on the given portion of the steering shaft while defining a cylindrical space between the worm wheel and the collar member; a resilient collar unit disposed and compressed in the cylindrical space to induce rotation of the collar member when the worm wheel is rotated; and an electric motor held by the housing, the motor rotating the worm wheel with an electric power.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, two embodiments 100 and 200 of the present invention will be described with reference to the accompanying drawings.

For ease of understanding, various directional terms, such as, left, leftward, right, rightward, upper, upward, lower, downward and the like are used in the description. However, it is to be noted that such terms are to be understood with respect to a drawing or drawing on which corresponding part or portion is shown.

Figure 1:
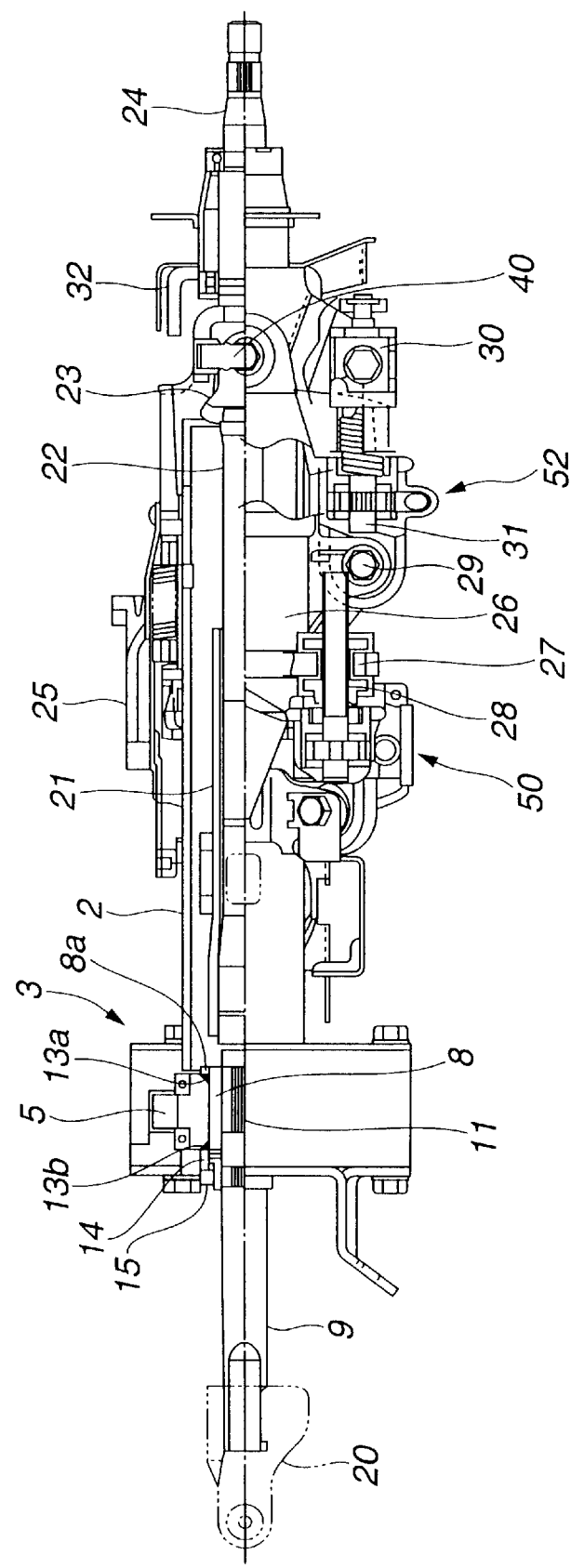
FIG. 1 is a partially sectioned side view of an electric steering column which is a first embodiment of the present invention.

Referring to FIGS. 1 to 5, particularly FIG. 1, there is shown an electric steering column 100 which is a first embodiment of the present invention.

As will become apparent as the description proceeds, the electric steering column 100 shown in the drawings is of a position adjustable type that includes both a power tilting mechanism that can adjust the height of a steering wheel with an electric power and a power telescopic mechanism that can adjust the fore-and-aft position of the steering wheel with an electric power.

Figure 4:
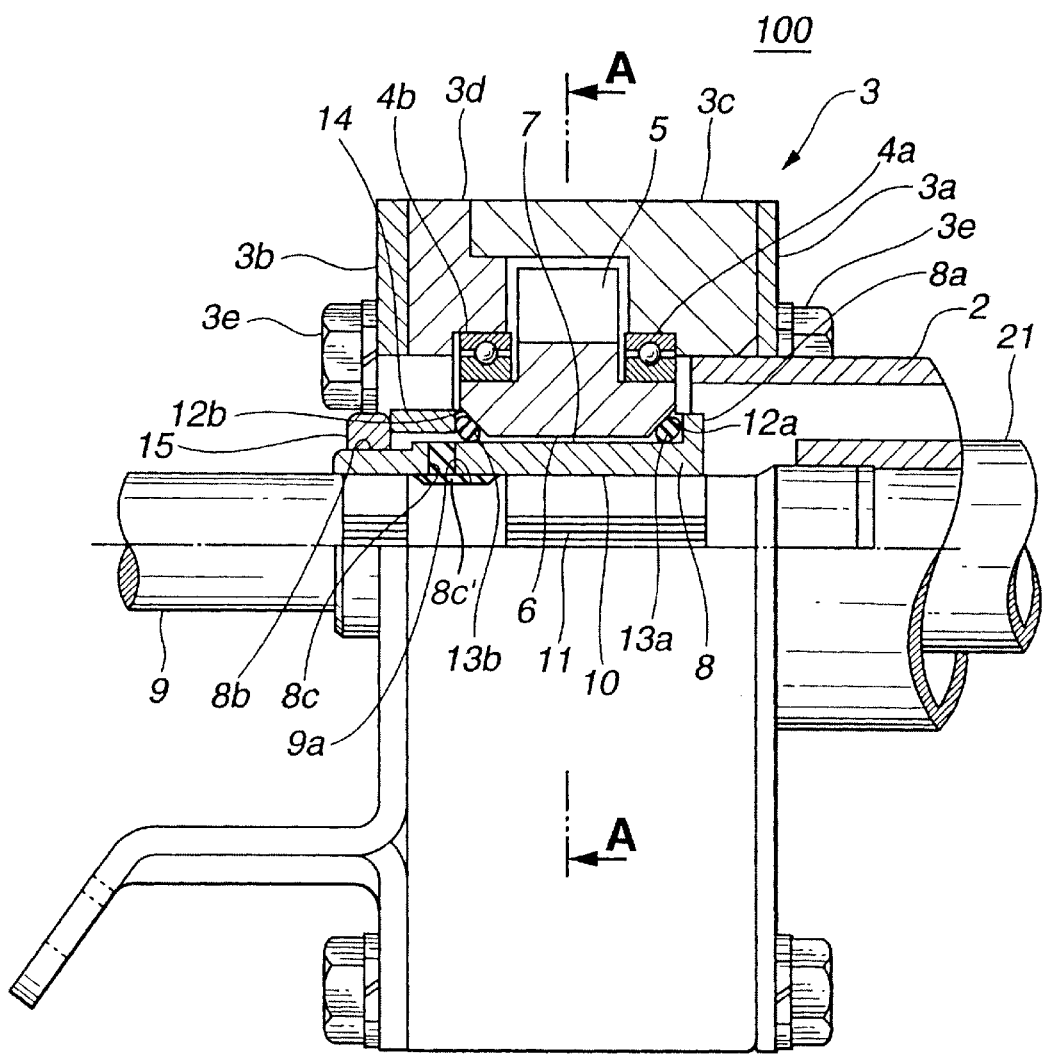
FIG. 4 is an enlarged sectional view of the electric steering column of the first embodiment.

As is seen from FIGS. 1 and 4, the electric steering column 100 comprises a steering shaft 9 that extends leftward to a universal joint 20 of an intermediate shaft (not shown). It is to be noted that in these drawings, the right side is a position where a steering wheel (not shown) is provided and the left side is a position where the intermediate shaft extending to a steering gear box is provided.

A jacket tube 2 is coaxially disposed about the steering shaft 9 with a cylindrical space defined therebetween. An elongate housing 3 is secured to a left end of the jacket tube 2 in a manner to extend perpendicular to an axis of the jacket tube 2, as is best seen from FIG. 4.

As is understood from FIG. 4, the housing 3 generally comprises a container body member 3d and a lid member 3c which are sandwiched between two end plates 3a and 3b. These two end plates 3a and 3b have respective circular openings that are tightly disposed on the left end of the jacket tube 2. A plurality of bolts 3e are used for uniting the parts 3a, 3b, 3c and 3d together and securing the same to the left end of the jacket tube 2.

Within the housing 3, there is rotatably installed a worm wheel 5 through axially spaced two bearings 4a and 4b. The worm wheel 5 is formed with a center bore 6 which receives therein a given part of the steering shaft 9 with a certain cylindrical space kept therebetween.

Figure 5:
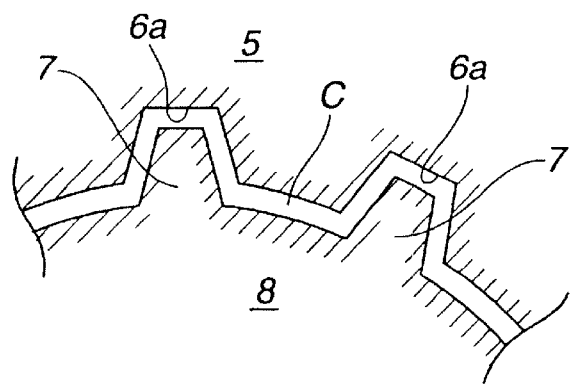
FIG. 5 is a sectional view taken along the line A—A of FIG. 4.

The cylindrical wall of the center bore 6 of the worm wheel 5 is serrated and thus, as is seen from FIG. 5, the cylindrical wall is formed with a plurality of parallel grooves 6a (internal wall structure) at evenly spaced intervals.

Within the center bore 6 of the worm wheel 5, there is concentrically disposed a collar member 8 which is coaxially disposed on the given part of the steering shaft 9 via a serrated engagement. For this serrated engagement, the collar member 8 has a serrated inner surface 10 that is engaged with a serrated outer surface 11 of the given part of the steering shaft 9. Thus, the collar member 8 rotates together with the steering shaft 9 like a single unit. However, if desired, the collar member 8 may be integrated with the steering shaft 9.

As is seen from FIG. 5, the collar member 8 has a serrated outer surface, that is, the outer surface is formed with a plurality of parallel ridges 7 at evenly spaced intervals.

For the reason which will become apparent hereinafter, the ridges 7 are loosely engaged with the grooves 6a of the worm wheel 5. Of course, when intimately meshed, these two members 5 and 8 rotate like a single unit inducing rotation of the steering shaft 9 about its axis in one or the other direction.

For suppressing axial displacement of the collar member 8 relative to the steering shaft 9, a molded plastic key 8c is disposed in an opening 8c formed in the collar member 8 and an annular groove 9a formed around the steering shaft 9.

As is seen from FIG. 5, the ridges 7 of the collar member 8 are loosely received in the grooves 6a of worm wheel 5 leaving a certain clearance "C" therebetween. The clearance "C" is provided for absorbing or compensating a possible ill-alignment between the worm wheel 5 and the collar member 8, that is, between the housing 3 and the steering shaft 9, which may be produced at the time of assembly or during practical usage of the steering column 100.

As is seen from FIG. 4, the collar member 8 has an annular flange 8a at its right end and a threaded leading end portion 8b at its left end. Axially both ends of the center bore 6 of the worm wheel 5 are chamfered, which are denoted by numerals 12a and 12b. Within an annular space defined by the right chamfered end 12a, the annular flange 8a and the right end portion of the collar member 8, there is disposed an O-ring 13a that is made of an elastic material, such as rubber or the like. Within another annular space defined by the left chamfered end 12b, a right edge of a holding ring 14 and a left portion of the collar member 8, there is disposed another O-ring 13b that is also made of an elastic material, such as rubber or the like.

The two O-rings 13a and 13b are compressed by the holding ring 14 that is biased rightward by a nut member 15 that is engaged with the threaded left end portion 8b of the collar member 8.

With provision of the O-rings 13a and 13b being compressed, a torque of the worm wheel 5 can be transmitted to the collar member 8 while keeping the clearance "C" between walls of the grooves 6a of the worm wheel 5 and the ridges 7 of the collar member 8.

If, due to application of an abnormal force to one of the worm wheel 5 and the collar member 8, there is produced an ill-alignment between the axis of the worm wheel 5 and that of the collar member 8, such ill-alignment is absorbed or compensated by the elastic deformation of the O-rings 13a and 13b.

Figure 2:
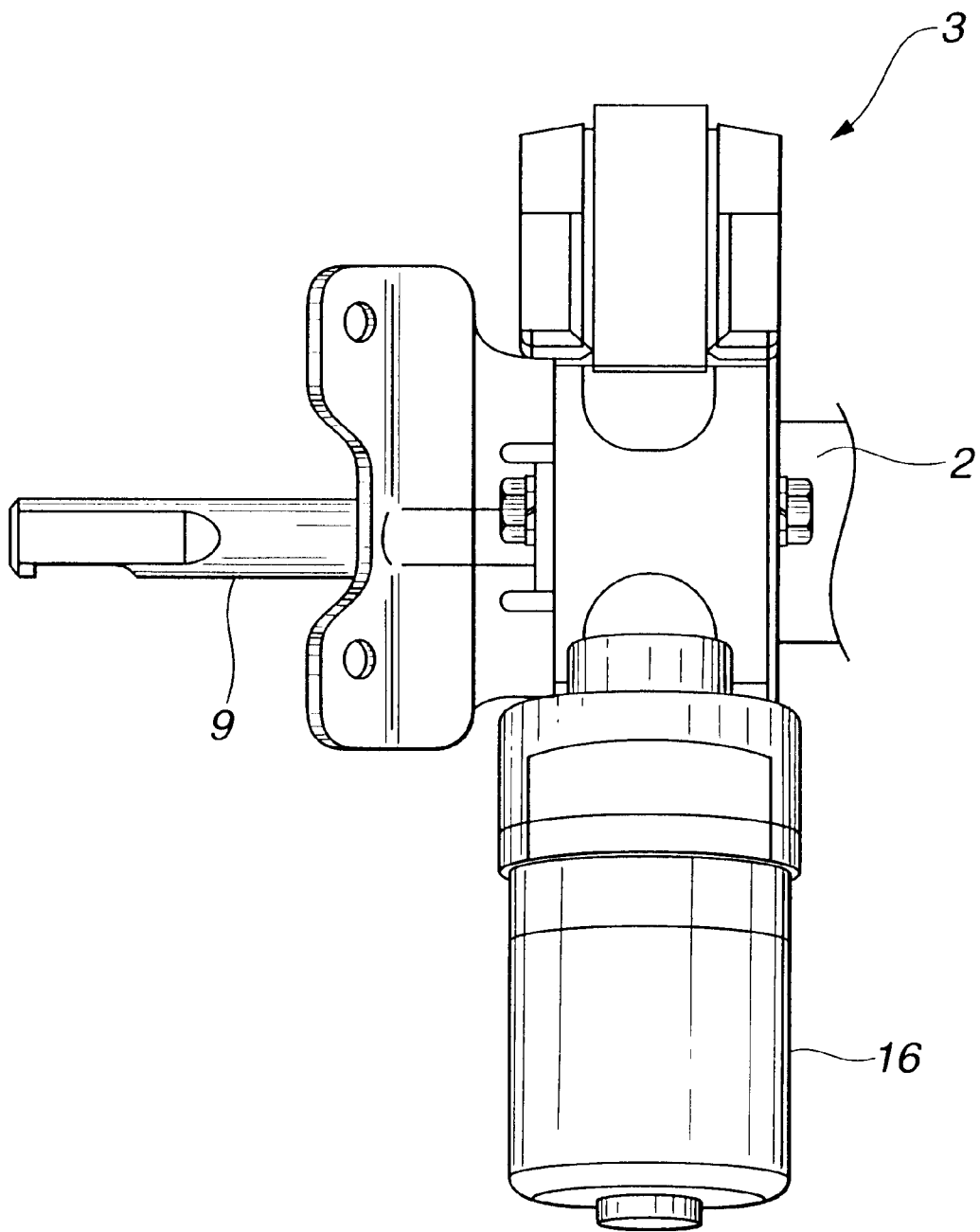
FIG. 2 is an enlarged plan view of an essential part of the electric steering column of the first embodiment.
Figure 3:
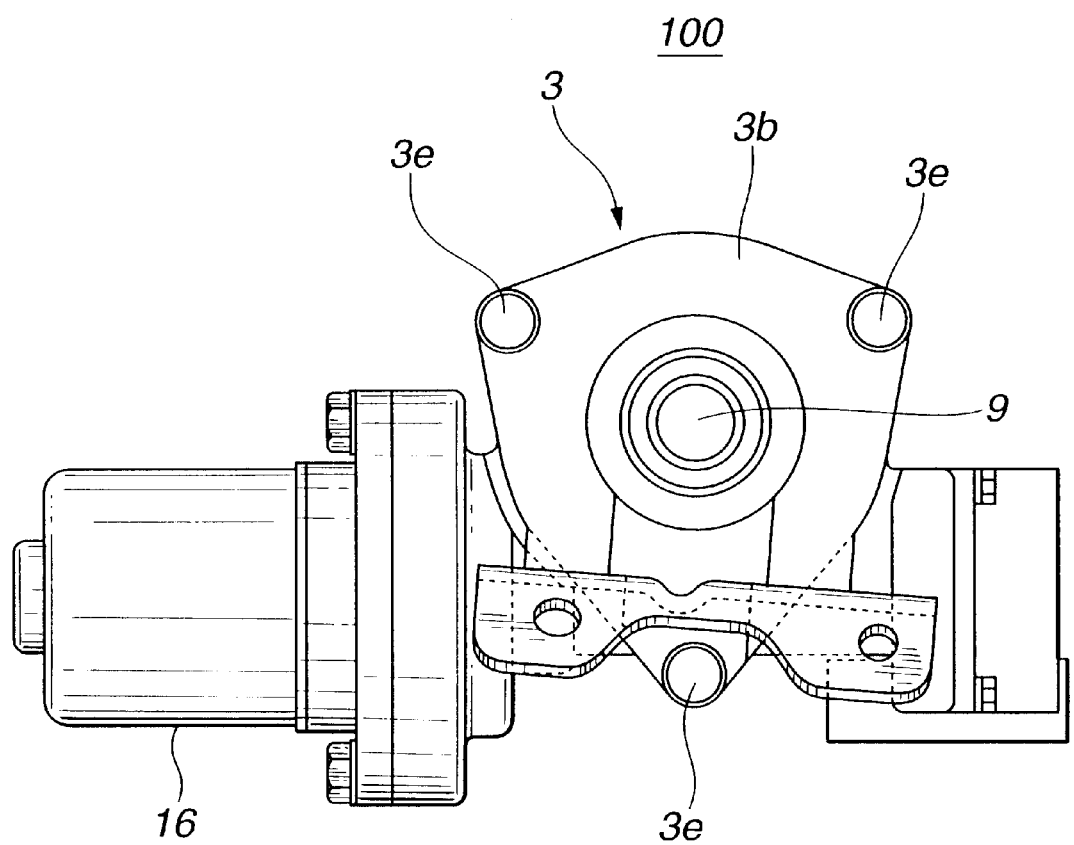
FIG. 3 is an enlarged back view of the essential part of the electric steering column of the first embodiment.

As is seen from FIGS. 2 and 3, to the housing 3, there is fixed an electric motor 16 whose output shaft (not shown) extends in a direction perpendicular to the axis of the steering shaft 9. As may be understood from FIG. 3, a worm (not shown) fixed to the output shaft of the electric motor 16 is operatively meshed with the worm wheel 5. Thus, upon energization of the electric motor 16, the torque of the motor 16 is transmitted to the steering shaft 9 through the worm (not shown), the worm wheel 5, the O-rings 13a and 13b, the collar member 8, the serrated inner surface 10 of the collar member 8 and the serrated outer surface 11 of the steering shaft 9.

As has been mentioned hereinabove, due to provision of the compressed O-rings 13a and 13b, under the torque transmission from the worm wheel 5 to the collar member 8, there is no direct contact between the walls of the grooves 6a of the worm wheel 5 and the ridges 7 of the collar member 8. This brings about a quiet and smoothed torque transmission from the worm wheel 5 to the collar member 8. Even if an ill-alignment takes place between the worm wheel 5 and the collar member 8, the elastic O-rings 13a and 13b function to absorb or compensate such ill-alignment thereby keeping the quite and smoothed torque transmission form the worm wheel 5 to the collar member 8 and thus to the steering shaft 9.

Referring back to FIG. 1, a tube 21 is coaxially disposed on the steering shaft 9 and extends rightward. An upper shaft 22 has a left end which is axially movably disposed in the right end of the tube 21. A spline connection is defined between the upper shaft 23 and the tube 21 for allowing an axial movement of the upper shaft 23 relatives to the tube 21. The upper shaft 23 is connected through a universal joint 23 to a shaft 24 to which a steering wheel (not shown) is fixed. An upper bracket 25 is secured to the jacket tube 2 for holding the steering column 100 to a vehicle body. A telesco-housing 26 is disposed in and secured to the upper shaft 22. A nut member 27 is rotatably held by the telesco-housing 26. Engaged with the nut member 27 is a screw shaft 28 that is driven by an electric motor 50 held by the jacket tube 2. Thus, when the electric motor 50 is energized, the upper shaft 22 is axially moved in one or the other direction relative to the tube 21. With this, the axial position of the steering wheel can be adjusted. That is, the tube 21, the upper shaft 22, the telesco-housing 26, the nut member 27, the nut member 27 and the electric motor 50 constitutes a so-called power telescopic mechanism through which the fore-and-aft position of the steering wheel can be adjusted with the aid of electric power.

The shaft 24 is held by a tilt-housing 32 that is pivotally connected to an upper portion of the telesco-housing 26 through a tilting bolt 40. Thus, about the tilting bolt 40, the tilt-housing 32 can pivot upward and downward. A nut member 30 is rotatably held by the tilt housing 32 and a screw shaft 31 driven by an electric motor 52 is engaged with the nut member 30. Thus, when the electric motor 52 is energized, the shaft 24 to which the steering wheel is fixed is pivoted upward or downward about the tilting bolt 40. With this, the height of the steering wheel can be adjusted. That is, the tilt-housing 32, the tilting bolt 40, the nut member 30, the screw shaft 31 and the electric motor 52 constitutes a power tiling mechanism through which the height of the steering wheel can be adjusted with the aid of electric power.

Figure 6:
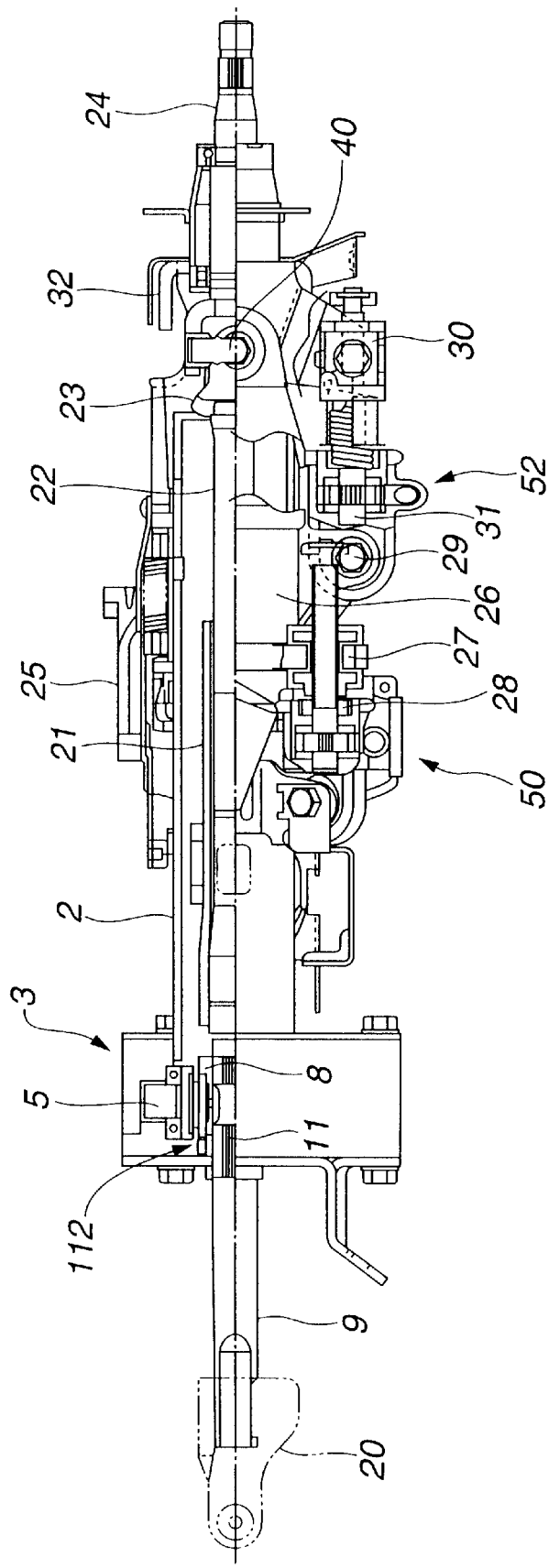
FIG. 6 is a view similar to FIG. 1, but showing a second embodiment of the present invention.
Figure 7:
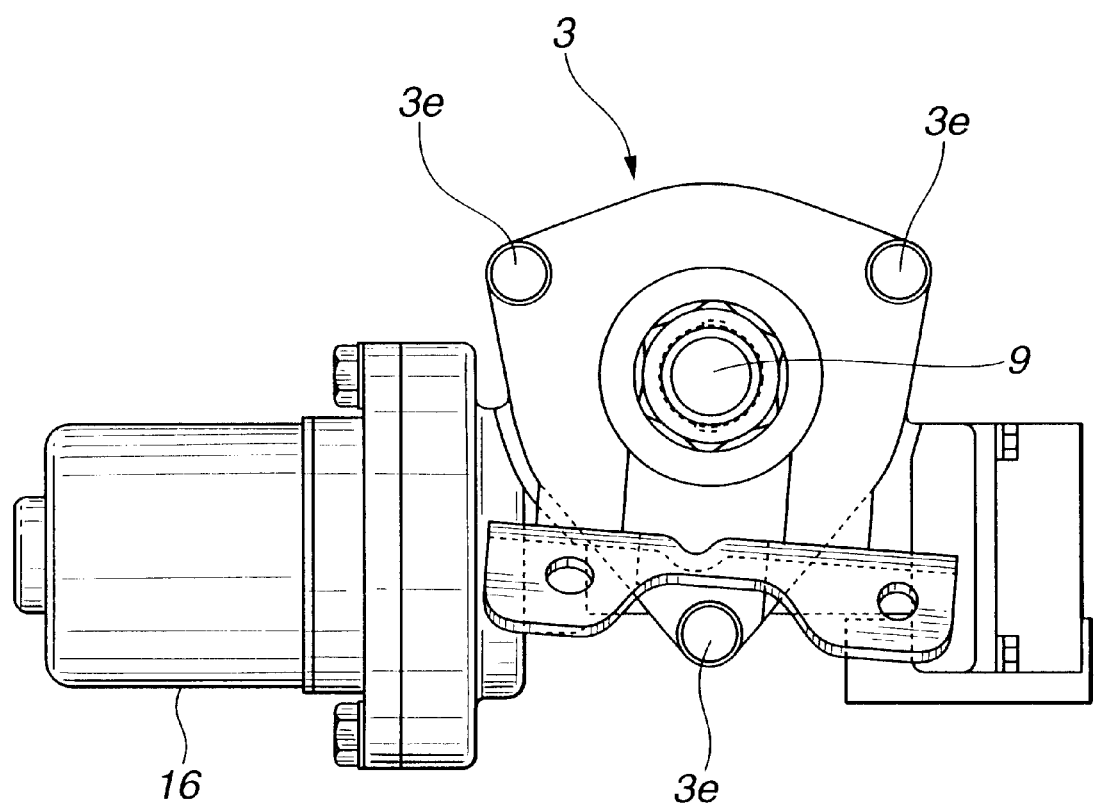
FIG. 7 is a view similar to FIG. 3, but showing an essential part of the electric steering column of the second embodiment.
Figure 8:
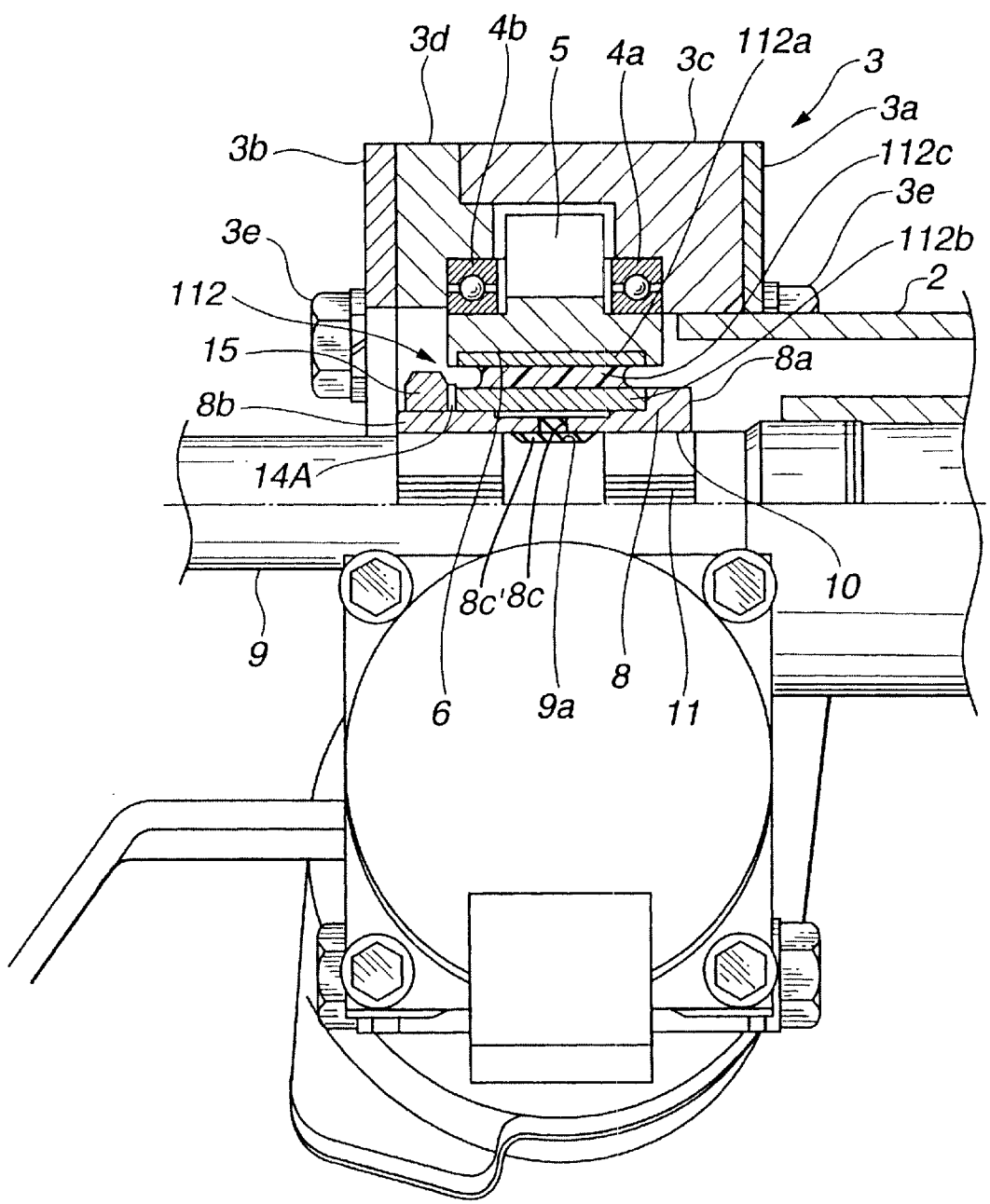
FIG. 8 is a view similar to FIG. 4, but showing the essential part of the electric steering column of the second embodiment.

Referring to FIGS. 6 to 8, there is shown an electric steering column 200 which is a second embodiment of the present invention.

Similar to the above-mentioned first embodiment 100, the electric steering column 200 of this second embodiment is of a position adjustable type that includes both the power tilting mechanism and the power telescopic mechanism.

As is seen from FIGS. 6 to 8, the electric steering column 200 comprises a steering shaft 9 that extends leftward to a universal joint 20 of an intermediate shaft (not shown). A jacket tube 2 is coaxially disposed about the steering shaft 9 with a cylindrical space defined therebetween. An elongate housing 3 is secured to a left end of the jacket tube 2 in a manner to extend perpendicular to an axis of the jacket tube 2.

As is understood from FIG. 8, the housing 3 generally comprises a container body member 3d and a lid member 3c which are sandwiched between two end plates 3a and 3b. These two end plates 3a and 3b have respective circular openings that are tightly disposed on the left end of the jacket tube 2. A plurality of bolts 3e are used for uniting the parts 3a, 3b, 3c and 3d together and securing the same to the left end of the jacket tube 2.

Within the housing 3, there is rotatably installed a worm wheel 5 through axially spaced two bearings 4a and 4b. The worm wheel 5 is formed with a center bore 6 which receives therein a given part of the steering shaft 9 with a certain cylindrical space kept therebetween.

Within the center bore 6 of the worm wheel 5, there is concentrically and spacedly received a collar member 8 which is tightly disposed on the given part of the steering shaft 9 via a serrated engagement. For this serrated engagement, the collar member 8 has a serrated inner surface 10 that is engaged with a serrated outer surface 11 of the given part of the steering shaft 9. Thus, the collar member 8 rotates together with the steering shaft 9 like a single unit.

For suppressing axial displacement of the collar member 8 relative to the steering shaft 9, a molded plastic key 8c (see FIG. 8) is disposed in an opening 8c formed in the collar member 8 and an annular groove 9a formed around the steering shaft 9.

The collar member 8 has an annular flange 8a at its right end and a threaded leading end portion 8b at its left end.

Within a cylindrical space defined between the worm wheel 5 and the collar member 8, there is compressed a resilient collar unit 112. The resilient collar unit 112 comprises an outer tube 112a intimately received in an annular groove (no numeral) formed in the wall of the center bore 6 of the worm wheel 5, an inner tube 112b tightly disposed on the collar member 8 and an annular elastic member 112c tightly interposed between the outer and inner tubes 112a and 112b. The annular elastic member 112c is constructed of rubber or the like. It is to be noted that the annular elastic member 112c is secured to the outer and inner tubes 112a and 112b through vulcanization bonding.

As shown in the drawing (FIG. 8), the inner tube 112b is fitted to the collar member 8 by means of a nut member 15 that is engaged with the threaded left end portion 8b of the collar member 8. A washer 14A is tightly interposed between the inner tube 112b and the nut member 15. That is, by fastening the nut member 15 to the collar member 8 having the washer 14A pressed between the nut member 15 and the inner tube 112b, the inner tube 112b is fitted to the collar member 8 due to a friction force produced therebetween and thus the resilient collar unit 112 can rotate together with the collar member 8 and thus with the steering shaft 9. The friction force produced should be so determined that the driving force of the motor 16 is effectively transmitted to the sheering shaft 9 and when the steering shaft 9 is applied with an abnormally large external force, a slippage takes place between the collar member 8 and the inner tube 112b.

With provision of the resilient collar unit 112 being compressed, a torque of the worm wheel 5 can be smoothly transmitted to the collar member 8 without making noises. If, due to application of an abnormal force to one of the worm wheel 5 and the collar member 8, there is produced an ill-alignment between the axis of the worm wheel 5 and that of the collar member 8, such ill-alignment is absorbed or compensated by the elastic deformation of the resilient collar unit 112.

As is seen from FIG. 7, to the housing 3, there is fixed an electric motor 16 whose output shaft (not shown) extends in a direction perpendicular to the axis of the steering shaft 9. As may be understood from this drawing, a worm (not shown) fixed to the output shaft of the electric motor 16 is operatively meshed with the worm wheel 5. Thus, upon energization of the electric motor 16, the torque of the motor 16 is transmitted to the steering shaft 9 through the worm (not shown), the worm wheel 5, the resilient collar unit 112, the collar member 8, the serrated inner surface 10 of the collar member 8 and the serrated outer surface 11 of the steering shaft 9.

As has been mentioned hereinabove, due to provision of the compressed resilient collar unit 112, the torque transmission from the worm wheel 5 to the collar member 8 is quietly carried out. If an ill-alignment takes place between these two members 5 and 8, the resilient collar unit 112 functions to absorb or compensate such ill-alignment.

Referring back to FIG. 6, a power telescopic mechanism and a power tilting mechanism are provided as being incorporated with the steering column 200. However, since these two mechanisms are the same as those that have been described in the first embodiment 100, explanation of them will be omitted.

As will be understood from the foregoing description, in the electric steering column of the present invention, there is provided a compressed elastic means (viz., O-rings 13a and 13b in case of the first embodiment, and resilient collar unit 112 in case of the second embodiment) between the worm wheel 5 and the collar member 8. Thus, the torque of the worm wheel 5 is smoothly and quietly transmitted to the collar member 8 and thus to the steering shaft 9. Furthermore, even if an ill-alignment is induced due to some reasons, the elastic compression of the elastic means absorbs or compensates such ill-alignment, and thus the smoothed and quiet torque transmission is assuredly maintained.

The entire contents of Japanese Patent Applications 11-183033 (filed Jun. 29, 1999) and 11-246895 (filed Sep. 1, 1999) are incorporated herein by reference.

Although the invention has been described above with reference to the two embodiments of the invention, the invention is not limited to such embodiments as described above. Various modifications and variations of such embodiments may be carried out by those skilled in the art, in light of the above descriptions.

What is claimed is:

1. An electric steering column as comprising:

a steering shaft;

a jacket tube extending along the steering shaft to cover the same;

a worm wheel rotatably held by said jacket tube, said worm wheel having a center bore through which a given portion of said steering shaft passes defining a given annular space therebetween;

a collar member coaxially disposed on said given portion of said steering shaft to rotate together with said steering shaft, said collar member and said worm wheel defining therebetween an annular clearance;

an elastically deformable structure put and compressed in said annular clearance in such a manner as to induce a rotation of said collar member and thus of said steering shaft when said worm wheel is rotated; and an electric motor that rotates said worm wheel with an electric power;

in which said elastically deformable structure comprises O-rings that are made of an elastic material.

2. An electric steering column as claimed in claim 1, in which said collar member has a serrated inner surface that is operatively engaged with a serrated outer surface of said given part of said steering shaft and in which a molded plastic key is provided between said collar member and said given part to suppress axial displacement of the collar member relative to said steering shaft.

3. An electric steering column as claimed in claim 1, in which said worm wheel is formed around a wall of said center bore thereof with equally spaced parallel grooves, and in which said collar member is formed around an outer surface thereof with a plurality of parallel ridges which are respectively put in said parallel grooves keeping a given space therebetween.

4. An electric steering column as claimed in claim 3, in which each of said O-rings is in contact with a chamfered portion formed in an axial end of said center bore of said worm wheel.

5. An electric steering column as claimed in claim 4, further comprising:

an annular flange formed on one end of said collar member, said annular flange being in contact with one of said O-rings;

a threaded portion formed on the other end of said collar member;

a holding ring coaxially disposed about said collar member, said holding ring being in contact with the other of said O-rings; and a nut member operatively engaged with said threaded portion of said collar member to bias said holding ring toward said worm wheel thereby to compress said O-rings and thus to restrict an axial displacement of said of said worm wheel relative to said collar member.

6. An electric steering column comprising:

a steering shaft;

a jacket tube extending along the steering shaft to cover the same;

a worm wheel rotatably held by said jacket tube, said worm wheel having a center bore through which a given portion of said steering shaft passes defining a given annular space therebetween;

a collar member coaxially disposed on said given portion of said steering shaft to rotate together with said steering shaft, said collar member and said worm wheel defining therebetween an annular clearance;

an elastically deformable structure put and compressed in said annular clearance in such a manner as to induce a rotation of said collar member and thus of said steering shaft when said worm wheel is rotated; and an electric motor that rotates said worm wheel with an electric power;

in which said elastically deformable structure comprises:

an outer tube concentrically attached to an inner wall of said center bore of said worm wheel;

an inner tube concentrically attached to an outer wall of said collar member; and a cylindrical elastic member coaxially disposed and compressed between said outer and inner tubes.

7. An electric steering column as claimed in claim 6, in which said annular elastic member is secured to said outer and inner tubes by means of vulcanization bonding.

8. An electric steering column as claimed in claim 7, in which said outer tube is intimately received in an annular recess formed in the annular wall of the center bore of said worm wheel, and in which said inner tube is detachably connected to said collar member by means of a nut member.

9. An electric steering column as claimed in claim 6, in which said collar member has a serrated inner surface that is operatively engaged with a serrated outer surface of said given part of said steering shaft and in which a molded plastic key is provided between said collar member and said given part to suppress axial displacement of the collar member relative to said steering shaft.

10. An electric steering column comprising:

a steering shaft;

a jacket tube extending along said steering shaft to cover the same;

a housing fixed to said jacket tube;

a worm wheel rotatably held in said housing, said worm wheel having a center bore through which a given portion of said steering shaft loosely passes;

an internal gear structure integrally formed on a cylindrical wall of the center bore of said worm wheel;

a collar member loosely received in said center bore of said worm wheel and tightly disposed on said given portion of said steering shaft;

an external gear structure integrally formed on a cylindrical outer wall of said collar member, said external gear structure and said internal gear structure being meshed leaving a certain space therebetween;

O-rings made of elastic material, each O-ring being compressed between said internal and external gear structures to induce rotation of said collar member when said worm wheel is rotated; and an electric motor held by said housing, said motor rotates said worm wheel with an electric power.

11. An electric steering column as claimed in claim 10, in which said worm wheel is formed at axial ends of said center bore with chambered portions against which said O-rings are pressed respectively.

12. An electric steering column as claimed in claim 10, further comprising:

an annular flange integrally formed on one axial end of said collar member to hold one of said O-rings;

a threaded portion integrally formed on the other axial end of said collar member;

a nut member engaged with said threaded portion of said collar member; and a holding ring interposed between said nut member and the other of said O-rings to bias the O-rings toward said worm wheel.

13. An electric steering column comprising:

a steering shaft;

a jacket tube extending along said steering shaft to cover the same;

a housing fixed to said jacket tube;

a worm wheel rotatably held in said housing, said worm wheel having a center bore through which a given portion of said steering shaft loosely passes;

a collar member tightly disposed on said given portion of said steering shaft defining a cylindrical space between said worm wheel and said collar member; a resilient collar unit disposed and compressed in said cylindrical space to induce rotation of said collar member when said worm wheel is rotated; and an electric motor held by said housing, said motor rotating said worm wheel with an electric power, in which said resilient collar unit comprises:

an outer tube tightly received in said center bore of said worm wheel;

an inner tube tightly disposed on said given portion of said steering shaft; and an annular elastic member concentrically disposed and compressed between said outer and inner tubes.

14. An electric steering column as claimed in claim 13, in which said annular elastic member is secured to said outer and inner tubes by means of vulcanization bonding.

15. An electric steering column as claimed in claim 14, in which said outer tube of said resilient collar unit is intimately received in an annular groove formed in a wall of said center bore of said worm wheel, and in which said inner tube of said resilient collar unit is secured to said collar member by means of a nut member.

* * * * *